United States Patent [19]
Philipps et al.

[11] Patent Number: 5,181,423
[45] Date of Patent: Jan. 26, 1993

[54] APPARATUS FOR SENSING AND TRANSMITTING IN A WIRELESS MANNER A VALUE TO BE MEASURED

[75] Inventors: Michael Philipps, Darmstadt; Hans-Dieter Schad, Weiterstadt; Wolfgang Viel, Darmstadt, all of Fed. Rep. of Germany

[73] Assignee: Hottinger Baldwin Messtechnik GmbH, Darmstadt, Fed. Rep. of Germany

[21] Appl. No.: 775,828

[22] Filed: Oct. 11, 1991

[30] Foreign Application Priority Data

Oct. 18, 1990 [DE] Fed. Rep. of Germany ....... 4033053

[51] Int. Cl.⁵ ............................................. G01H 9/12
[52] U.S. Cl. .................................... 73/724; 73/146.5; 73/702; 340/448; 340/626; 340/870.31; 364/558
[58] Field of Search ..................... 73/146.5, 702, 146.8, 73/718, 724; 361/283; 340/626, 870.26, 870.31, 442, 448; 364/558

[56] References Cited

U.S. PATENT DOCUMENTS

| | | | |
|---|---|---|---|
| 3,790,910 | 2/1974 | McCormack | 364/558 |
| 4,749,993 | 6/1988 | Szabo et al. | 340/448 |
| 4,891,973 | 1/1990 | Bollweber et al. | 73/146.5 |

FOREIGN PATENT DOCUMENTS

| | | |
|---|---|---|
| 0245605 | 11/1987 | European Pat. Off. . |
| 0254445 | 1/1988 | European Pat. Off. . |
| 2221371 | 11/1973 | Fed. Rep. of Germany . |
| 2461212 | 10/1975 | Fed. Rep. of Germany . |
| 3503347 | 7/1987 | Fed. Rep. of Germany . |
| 3832985 | 4/1990 | Fed. Rep. of Germany . |
| 2951139 | 6/1990 | Fed. Rep. of Germany . |
| 3107947 | 10/1990 | Fed. Rep. of Germany . |
| 04089 | 5/1989 | World Int. Prop. O. . |

*Primary Examiner*—Donald O. Woodiel
*Attorney, Agent, or Firm*—W. G. Fasse

[57] ABSTRACT

A device for measuring physical values, such as pressure changes, includes a sensor transponder section and an interrogator receiver section for transmitting interrogation signals including a power supply from the interrogator receiver section to the sensor transponder section and for transmitting measured signal values in the opposite direction. The sections can be coupled to each other by inductive coils so that electrical connections are avoided. Thus, the pressure in a rotating automobile tire can be measured, for example. The sensor transponder section includes a computer circuit the input of which receives a reference frequency signal and a measured frequency signal. A reference oscillating signal has a frequency determining element that is not influenced by the pressure to be measured, but only by extraneous, e.g. environmental influences. A measuring oscillating circuit has a frequency determining element that is responsive to the changes in the physical value to be measured. Both frequency determining elements are so arranged that they are exposed to the same extraneous conditions, whereby adverse influences of these conditions on the measured values are compensated.

20 Claims, 4 Drawing Sheets

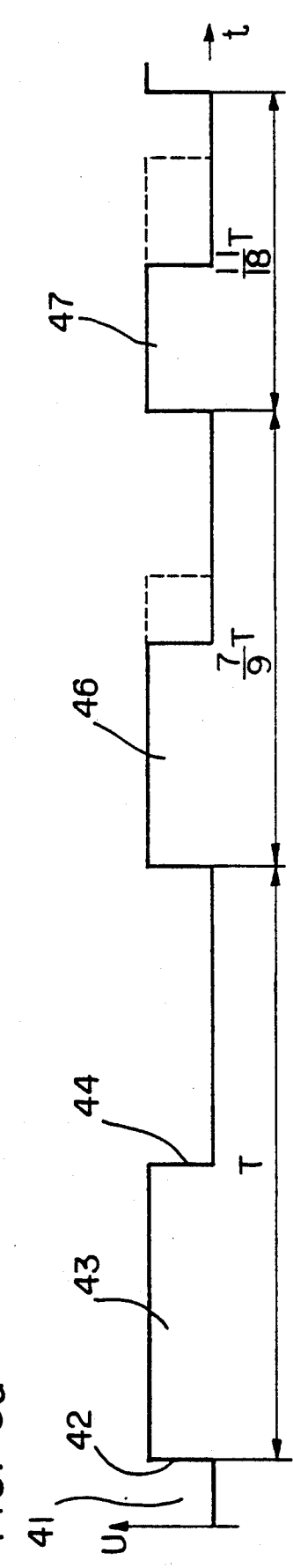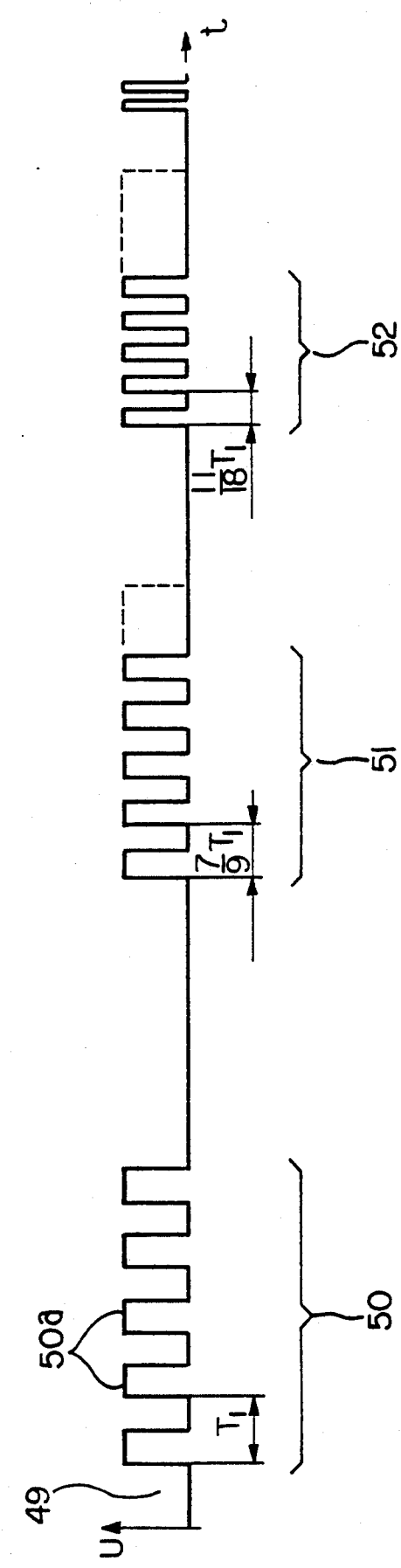
FIG. 3a
FIG. 3b

APPARATUS FOR SENSING AND TRANSMITTING IN A WIRELESS MANNER A VALUE TO BE MEASURED

FIELD OF THE INVENTION

The invention relates to an apparatus for sensing and transmitting a value to be measured. A sensor transponder section and an interrogator receiver section cooperate with each other in the sensing and transmitting of the value to be measured, especially in a wireless manner.

BACKGROUND INFORMATION

The acquisition of physical measured values, especially pressures, frequently requires that such values are ascertained in or on available or installed equipment. Sometimes this factor makes it problematic to find suitable connection points for the attachment of the transducer devices. Frequently, it happens that such connecting points are exposed to adverse environmental influences or conditions which adversely affect the useful life of the transducer devices or which at least make the precision of the transducers less reliable. Thus, it is practical to sense the physical values to be measured in one location where the measured value is also converted into an electrical value and to then further process the respective electrical value or values at a more suitable location. The just mentioned approach has its limitation in that difficulties will arise especially when a direct electrical connection between the measuring transducers and the signal processing devices is not possible. This difficulty applies in connection with equipment in which direct electrical connections are too trouble prone, for example, due to technical sealing problems, due to mechanical stress and/or vibrations, or due to thermal conditions. Difficulties with establishing direct electrical connections also occur especially in machines or at least machine components in which the measuring transducer location is movable relative to an indicator or display of the measured value or relative to a data processing device.

A measuring device of the type here involved is disclosed in German Patent Publication (DE-PS) 2,951,139 describing a device for the monitoring of the air pressure in vehicle tires A capacitive pressure sensor or transducer is located next to the rotating vehicle wheel, whereby any change in the tire pressure causes a respective change in the capacity of the capacitive sensor. Such a capacitive pressure sensor or transducer constitutes a frequency determinining structural circuit component of a multi-vibrator, the oscillating frequency of which becomes a measure for the tire pressure to be measured. Such a multi-vibrator comprises in addition to the sensor capacity an inductive coil, which together with the measuring or sensing capacity constitutes a pressure sensing structural component, referred to herein simply as a pressure sensor, which is so arranged that with each wheel revolution the pressure is passing, with a narrow spacing, an inductive coil forming part of an evaluating device, which receives the frequency converted measuring value signals and converts these signals into corresponding values, which in turn represent a measure for the tire pressure. In the just mentioned conventional example, it is, however, not necessary that the measured air pressure is ascertained with a special accuracy because the conventional device is intended to merely make sure that the tire pressure does not fall below a certain threshold value. However, the known pressure sensor would lead to substantial measuring errors, if the ambient temperature near the measuring capacitor should change substantially. This is so, because the mechanical dimensions of the pressure sensor alone would change due to heat-caused material expansions. In order to eliminate such external influences on the sensing capacitor, a substantial structural effort and expense would be necessary. However, even if such expense should be acceptable under certain circumstances, most of the time, there is not enough space for the installation of the sensor or it cannot be installed due to weight limitations which must be met by such a pressure sensor.

OBJECTS OF THE INVENTION

In view of the foregoing it is the aim of the invention to achieve the following objects singly or in combination:

to improve a value sensing and transmitting system in such a way, that the values or data to be measured can be ascertained and converted into useful signals while changing or different environmental influences cannot substantially change these values, even if the sensed values or converted signals must be transmitted over distances of substantial length;

a pressure sensor combined with an interrogator transponder according to the invention shall be compact and lightweight, so that it may be used where conventional sensors of this purpose could not be used heretofore;

to achieve a high measuring precision even under adverse operating conditions by eliminating the influences of such adverse operating conditions, especially environmental conditions;

to avoid a direct electrical connection between the interrogator transponder or between the transponder and a processing station; and to construct a sensor of this type for a contactless sensing of pressures present in rotating machinery components and the like.

SUMMARY OF THE INVENTION

The present sensing apparatus comprises a sensor transponder section and an interrogator receiver section, which are, at least for short time durations, coupled with each other, e.g. in an inductive manner. The sensor transponder section includes a measuring oscillating circuit, a reference oscillator circuit, and the transponder. The measuring oscillator circuit comprises frequency determining circuit components which are variable in response to the physical value to be measured. Thus, a measuring oscillator produces a measuring frequency which constitutes a measure for the measured physical value or quantity. The reference oscillator also comprises frequency determining circuit components which are not variable in response to the value to be measured, to produce a reference frequency. An induction coil in the sensor transponder section cooperates with a further induction coil in the interrogator receiver section for the transmission of an interrogator signal through the transponder to the sensor section and for the transmission of the sensed or measured value from the sensor to the receiver also through the transponder. Further, the sensor transponder section comprises a computer circuit with a fixed function for forming a reference frequency from the reference oscillator frequency in such a way, that the reference frequency is small relative to a measuring frequency of at least 1:10, preferably 1:100 or more, thereby forming a gate for activating with the gate output the input of a counting circuit which counts the respective measuring impulses during a gating time for controlling an electronic switch which in turn loads a transmission oscillating circuit of the transponder in the rhythm of the counted measuring impulses, thereby transmitting the measured value to the interrogator section functioning as a receiver of the sensed or measured value.

The invention has the advantage that the measured values are converted into electrical signals directly at the measuring location by the sensor elements, whereby these electrical values cannot be adversely affected, even over longer transmission distances, by environmental influences nor by system components participating in the transmission even if these system components are movable relative to each other. Thus, a high measuring precision is achieved by the measuring system according to the invention. This high measuring precision is achieved, because the frequency determining structural element which senses or measures the value and the frequency determining structural element in the reference oscillator are of the same type of construction and both these elements are arranged at the measuring location, whereby a computer circuit forming part of the sensor transponder section can eliminate adverse environmental influences. More specifically, the frequencies produced by these structural elements are interlinked by the computer circuit in such a manner that a quotient of the produced frequencies is produced. The quotient formation makes sure that the adverse environmental influences which are equally effective on both the measuring element and the reference element compensate each other.

Another advantage of the system according to the invention resides in the fact, that the measured values are sensed from the start as digital values so that they can be processed and transmitted with a very low electrical power consumption. Still another advantage is seen in that the construction of the sensor transponder section can be very compact, because the digital processing and any further processing of the digital measured values can be performed by integrated very small circuitry, (e.g. gate array computer circuit). Such circuits are generally known as ASICs (Application Specific Integrated Circuits). As a result, sensor transponder sections according to the invention can be used even where the available space is very limited. The digital measured values constitute an alternating voltage whereby it is possible to avoid substantial transponder circuits and simply use the inductive couplings for a contactless transmission of the measured voltages to other receiver components or the like. A direct electrical connection is thus not necessary, so that the transponder sections according to the invention, can be used for measurements on rotating structural components, such as vehicle wheels and the like, for example to measure the pressure in the tire of a rotating automobile wheel.

BRIEF DESCRIPTION OF THE DRAWINGS

In order that the invention may be clearly understood, it will now be described, by way of example, with reference to the accompanying drawings wherein:

FIG. 3a illustrates a square wave impulse diagram showing gating impulses, the duration of which varies for compensating influences that could adversely affect measured results;

FIG. 3b shows measured pulse trains which in conjunction with FIG. 3a illustrate the operation of the present system, whereby the gating impulses and the impulse trains are shown as a function of the operation of the reference oscillator and of the measuring oscillator.

DETAILED DESCRIPTION OF A PREFERRED EXAMPLE EMBODIMENT AND OF THE BEST MODE OF THE INVENTION

Figure 1:
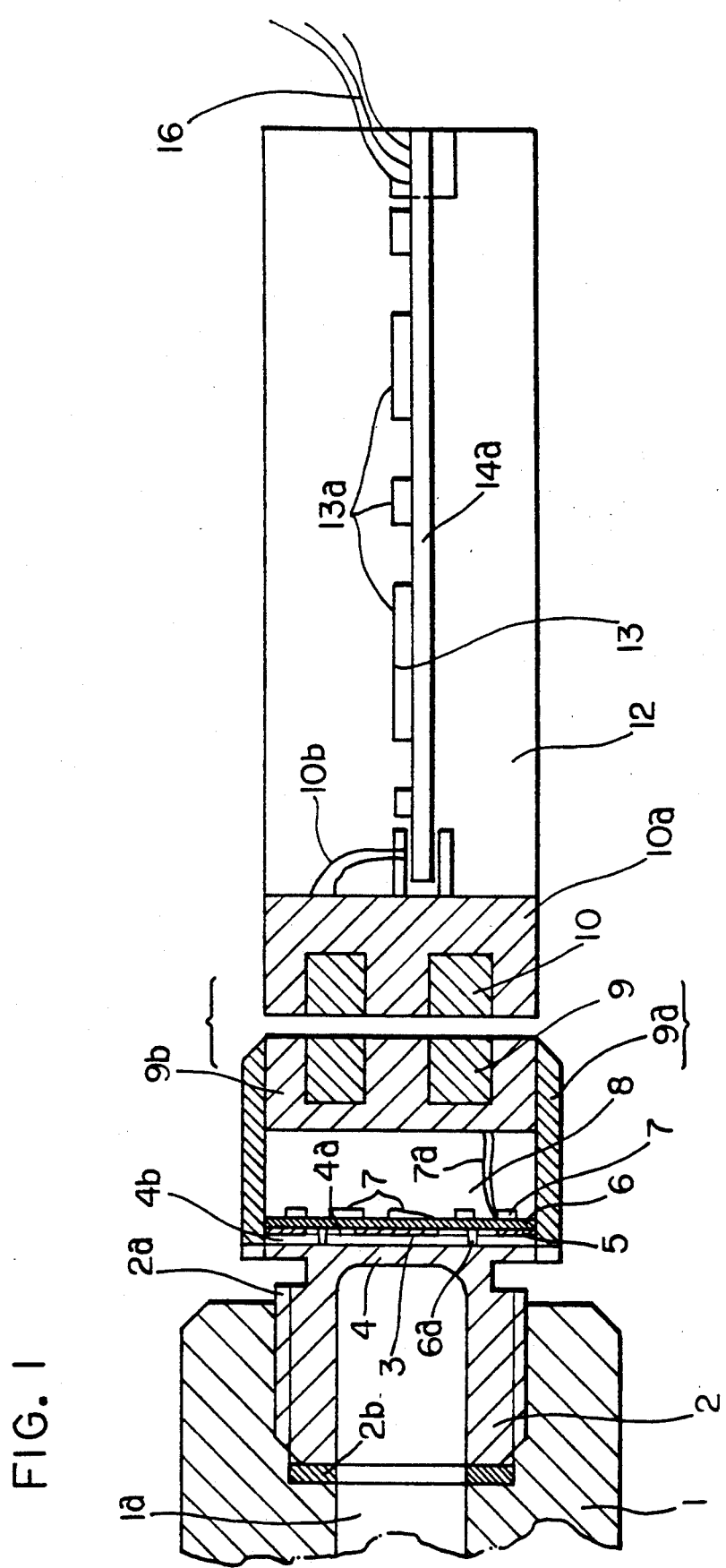
FIG. 1 shows a sectional view through the physical construction of a sensor transponder section and an interrogator receiver section, so constructed that these sections can be inductively coupled to each other for transmitting interrogator power supply signals in one direction and sensed signals in the return direction.

FIG. 1 shows schematically the structural components of the present measuring system including a sensor transponder section 8 and an interrogator receiver section 12. The system is capable of transmitting measured or sensed signals from the sensor transponder section in response to interrogation signals from the interrogator receiver section. The back and forth transmission between the two sections takes place through an inductive coupling between the two sections.

The sensor transponder section 8 comprises a sensor 2 for sensing a pressure. The sensor 2 in the form of a cup-shaped jacket is screwed, e.g. into a threaded cavity 1a of a structural component 1 containing a pressurized fluid, the pressure of which is to be measured. A threading 2a of the sensor 2 is threaded into a respective threading in the cavity 1a, whereby a sealing ring 2b prevents leaks. The cup-shaped jacket of the sensor 2 has a cover formed as a sensor membrane 4 exposed to the pressure medium in the cavity 1a. A measuring electrode 3 is arranged in parallel to and with a spacing relative to the sensor membrane 4. The mentioned spacing varies in response to pressure changes in the cavity 1a. The measuring electrode 3 is secured to a flat carrier plate 6, which is mounted at a fixed spacing relative to the membrane 4 in a housing 9a of the sensor transponder section 8. The fixed spacing between the carrier plate 6 and the surface of the membrane 4 is determined by a spacer ring 6a. However, an air gap 4a between the electrode 3 and the membrane 4 is variable in response to pressure changes in the cavity 1a, as mentioned. The spacer ring 6a is surrounded by a reference ring electrode 5 also supported by the carrier plate 6 and facing a ring flange 4b of the membrane 4. Instead of being filled with air, the gap 4a may be filled with another elastically yielding dielectric material, such as oil. The housing 9a is secured to the flange 4b of the membrane 4.

Figure 2:
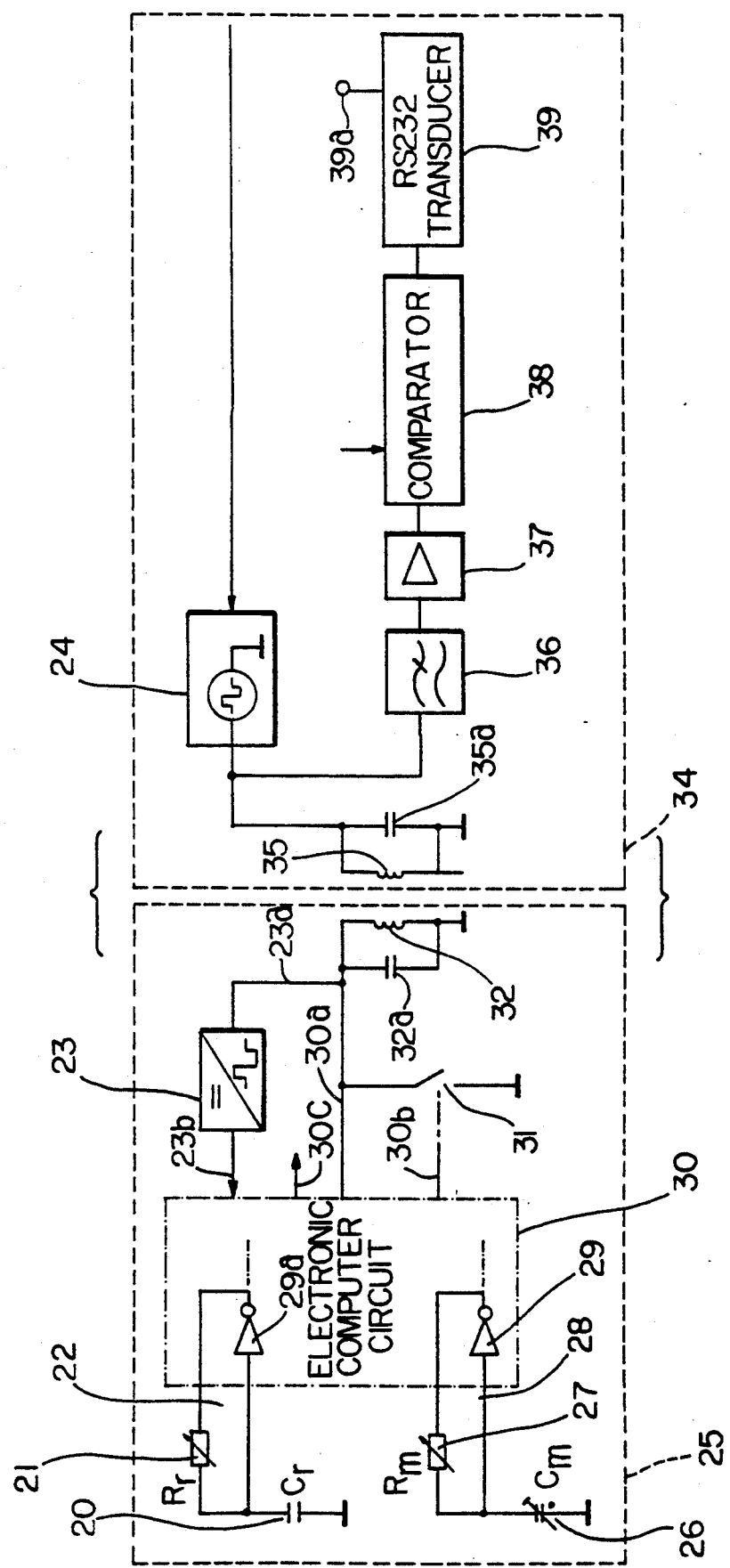
FIG. 2 is a block circuit diagram of the sensor transponder section and of the interrogator receiver section of FIG. 1.

The measuring electrode 3, the membrane 4, and the dielectric material therebetween form a measuring capacitor 26 having a variable capacity Cm which varies in response to pressure changes in the cavity 1a, see FIG. 2. The just described sensor elements 3, 4 are so dimensioned that the capacity changes are proportional to the pressure changes to be measured.

Referring further to FIG. 1, the carrier plate 6 also carries a ring reference electrode 5 extending around the carrier plate 6 and facing the above mentioned flange 4b of the membrane 4. The flange 4b or rather the axially facing surface thereof and the reference electrode 5 form together a reference capacitor 20 having a reference capacity Cr, see FIG. 2. The axially facing surface of the carrier plate 6 opposite the electrodes 3 and 5 carries electronic circuit components 7 forming an integrated computer circuit which is connected with the above mentioned measuring capacity Cm and reference capacity Cr forming the input to the computer circuit shown in more detail in FIG. 5.

The computer circuit processes the input signals provided by the capacities Cm and Cr, to form output signals that are computer-readable and which are supplied to an induction coil 9 through conductors 7a forming a transponder. The induction coil 9 is mounted in a housing 9a or rather in the cover 9b of the housing 9a. The transponder transmits the measured signals to the interrogator receiver section 12, without any direct electrical connection in response to interrogation and power supply signals from section 12. The induction coil 9 is arranged in the housing 9a relative to the carrier plate 6 on that side of the plate which carries the electronic circuit components 7. The induction coil 9 closes together with the cover 9b the housing 9a. Preferably, the housing 9a and its cover are cylindrical. The components of the sensor transponder section 8 form an integral self-contained unit that is mechanically connected only with the structural component 1 in which the pressure medium flows in the cavity 1a and the pressure of which is to be measured.

Such a self-contained unit or section 8 including the transponder induction coil 9 and the sensor 2 can be constructed in a very compact manner, so that the present pressure sensor can be built for measuring capacity changes representing excess pressures up to several hundred bars. Yet, the section 8 has length and diameter dimensions within the range of about 10 to 15 mm. As a result, sensor units or sections according to the invention can be installed with ease in a pressurized circuit since, due to their short axial length, the present sensors can be used in all those instances where a threaded bore can be made into a pressurized conduit. Further, since a direct electrical wire connection between the sensor transponder section 8 and the interrogator receiver section 12 is obviated, it is now possible to make the pressure reading or sensing by passing the induction coil 9 of the sensor transponder section 8 past the induction coil 10 of the interrogator receiver section 12 or vice versa. Thus, the present system is quite suitable for sensing the pressure inside rotating components, such as vehicle wheels. Another advantage of the invention is seen in that the self-contained construction of the section 8 makes it possible to use such a unit in adverse environmental operating conditions. Additionally, sealing problems, for example, due to conductor feed-through-bushings, are obviated since an electrical direct connection is not necessary due to the transmission through induction coils 9 and 10.

The interrogator receiver section 12 is also shown in FIG. 1 in a position relative to section 8 for receiving the measured values sensed by the sensor transponder section 8. The interrogator receiver section 12 comprises substantially a detector and the induction coil 10 mounted in a ferrite end section 10a of an interrogator receiver housing 14, which is preferably also of cylindrical construction. An electronic circuit board 14a is mounted in the housing 14 and carries an electronic receiver circuit 13 with circuit components 13a connected with an input to the induction coil 10 through conductors 10b. The output of the receiver circuit 13 is connected through output conductor 16 to a respective power supply, to measured value processing circuits, and/or to display devices not shown. Incidentally, the cover 9b is also made, for example, of ferrite.

As mentioned, the induction coil 10 is mounted in the cover or ferrite end section 10a of the housing 14. Preferably, the coil 10 is embedded in the ferrite material. The housing 14 serves as a carrier and mounting device for the above mentioned components 13, 13a.

For transmitting the measured values from the induction coil 9 into the induction detector coil 10, and for transmitting interrogation and power supply signals from coil 10 to coil 9, these two coils are brought into proximity with one another, whereby it is sufficient if one section 8 or 12 moves relative to the other section. The interrogator receiver section 12 thereby interrogates the sensor transponder section and also reads the measured pressure values in accordance with the rhythm of a clock frequency signal for demodulating and amplifying the measured values, so that these values may be supplied to signal processing devices or display devices as mentioned above. If these devices, especially the signal processing devices, require a signal conversion, a respective conversion unit of conventional construction will be used.

The apparatus disclosed in FIG. 1 is suitable not only for the transmission of measured pressure values, the apparatus is also suitable for measuring any physical values to be measured, provided these values are ascertainable by sensor-type structural components which have a frequency determining characteristic, so that these structural components can be used in an oscillating circuit. Thus, displacement and force measurements can be made, for example, if the sensor transponder section 8 is equipped with respective measuring and reference elements. In connection with the above mentioned pressure measurement, it is possible to use frequency determining structural components in the form of acoustical harmonic wave resonators, such as tuning fork quartz elements for embodying the measuring element and for the reference element. Such tuning fork quartz element may, for example, be a piezo-electric device of conventional construction.

FIG. 2 shows a block circuit diagram 25 of the sensor transponder section 8 and block circuit diagram 34 of the interrogator receiver section 12 according to the invention, both sections together forming a measuring unit, whereby two inductive coils 33 and 35, corresponding to the coils 9 and 10 shown in FIG. 1, are shown at a moment when these coils 33, 35 are coupled to each other for transmission.

Figure 4:
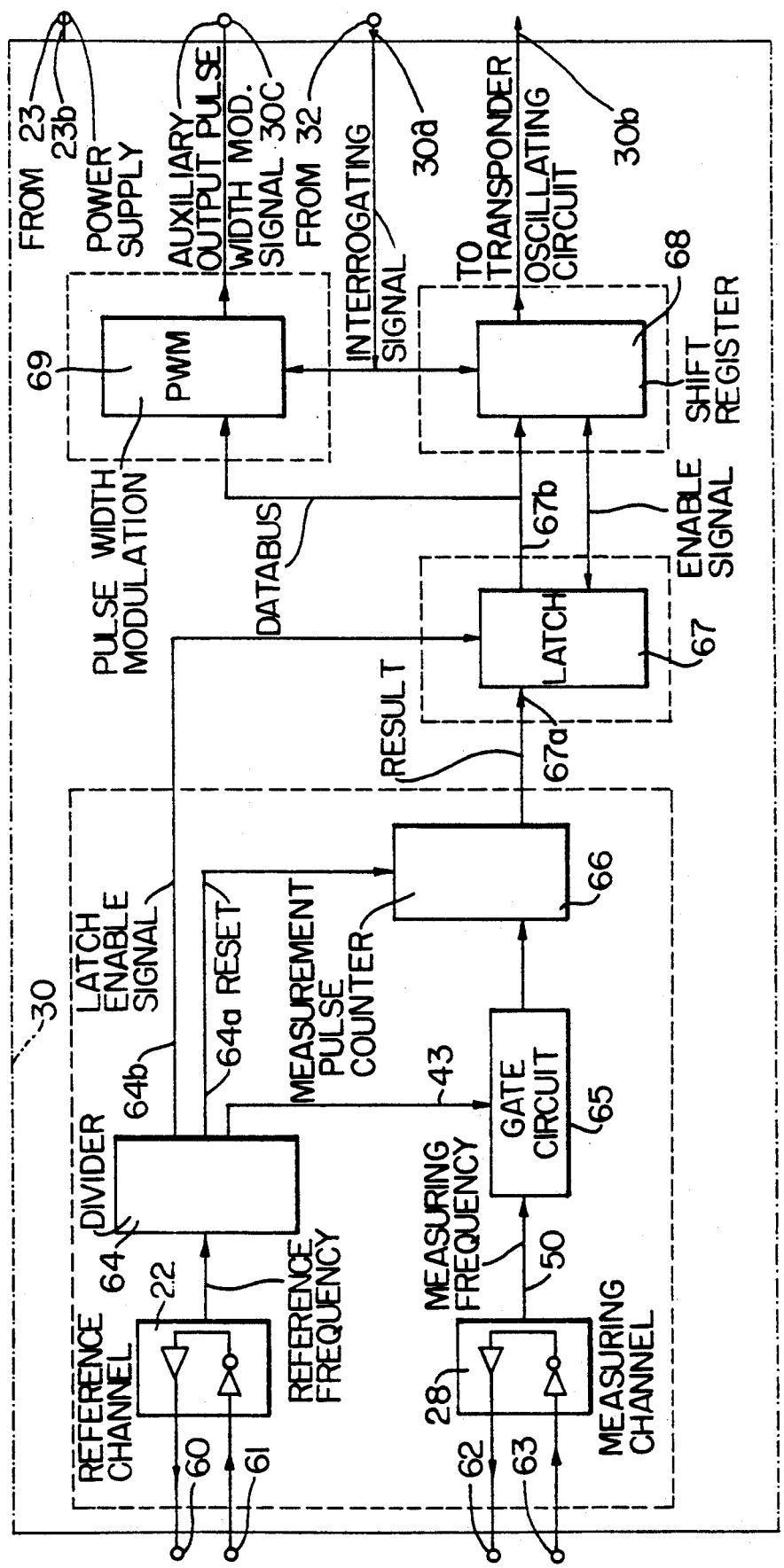
FIG. 4 is a more detailed block diagram of the gate-array computer circuit illustrating its fixed function.

The sensor transponder section 8 in the diagram 25 comprises two oscillating circuits 22 and 28 interconnected by an electronic computer circuit 30 to be described in more detail below with reference to FIG. 4. The oscillating circuit 22 is a reference oscillator and the oscillating circuit 28 constitutes the measuring oscillator as will be described in more detail below. Each of these circuits 22 and 28 comprises an RC oscillating circuit. The measuring oscillator 28 comprises an adjustable tuning resistor 27 having a resistance Rm and the above mentioned capacitor 26 having a measuring capacity Cm that varies in response to the physical value to be measured. The resistor 27 and the capacitor 26 are connected in series with each other. An inverter 29 is connected in parallel to the adjustable resistor 27. An amplifier may be part of the circuit as shown in FIG. 4. The reference oscillator 22 comprises a resistor 21 that is adjustable in its resistance Rr and a reference capacitor 20 having a capacity Cr not influenced by the value to be measured, but responsive to environmental influences. A further inverter 29a is connected in parallel to the adjustable resistor 21. The adjustable tuning resistor 21 and the capacity Cr are connected in series with each other. The two oscillating circuits 22 and 28 are linked to an integrated computer circuit 30 in such a way that an output signal is produced which controls an electronic switch 31 constituting a load on a parallel oscillating circuit 32 comprising a capacitor 32a and an induction coil 33 forming the transponder. The sensor transponder section 8, 25 comprises a power supply circuit 23 for producing a d.c. voltage signal from an a.c. voltage signal received from the interrogator receiver section 12, 34 through inductive coupling coils 32, 35 forming respective parallel resonance circuits with corresponding capacitors 32a and 35a.

The inductive coupling coil 32 with its capacitor 32a forming a transponder parallel resonance circuit and the coupling coil 35 with its capacitor 35 forming an interrogator parallel resonance circuit or parallel oscillating circuits cooperate with each other when the coils 32 and 35 are in the shown coupling position relative to each other. The interrogator oscillating circuit with coil 35 forms part of the power supply circuit. For this purpose the oscillating circuit with coil 35 is connected to a power supply signal generator 24, whereby power is transmitted from the interrogator receiver section 34 to the sensor transponder section 25. The same coupling circuits or coils 32 and 35 also transmit the measured signal from the section 25 to the section 34. For this purpose the coupling circuit or coil 35 is connected to a filter circuit 36 which filters and demodulates the measured signals. The demodulated signal is supplied to an amplifier 37, to a comparator 38, and to a signal converter 39, type RS234. The converter 39 provides at its output 39a a standardized digital, measured signal which can be further processed, for example, by a conventional personal computer able to directly read the output signal from the output 39a of the signal converter 39.

The function of the present system will now be described in more detail with reference to measuring changing pressures.

The oscillator capacitors 20 and 26 are so arranged that the measuring capacity Cm of the capacitor 26 is exposed directly to the pressure to be measured, please see FIG. 1. Specifically, the cover 4 forming the sensor membrane is one of the electrodes of the measuring capacitor 26 having the variable capacity Cm which is exposed to the pressure to be measured. The changing pressure varies the spacing between the electrode 3 and the membrane 4 and the changing spacing in turn changes the measuring capacity Cm, whereby the frequency of the measuring oscillator 28 is changed correspondingly. The membrane 4 is so constructed and dimensioned that the response characteristic of the measuring oscillator results in a frequency change that is proportional to the pressure change.

The frequency change of the measuring oscillator 28 could also be achieved by other frequency determining oscillator circuit components. For example, instead of the measuring capacity 26 an induction coil could be used in the measuring oscillator circuit, whereby the arrangement is such that the pressure change varies the inductivity of the induction coil, for example, by displacing an iron core in the induction coil. Instead of the just mentioned circuit components, a tuning fork type quartz which is responsive to the pressure changes, could be used to influence the oscillation frequency of the measuring oscillator 28 in response to a pressure change.

As mentioned above, the environment can influence changes in the sensor capacity Cm, whereby the measured results could be falsified. Such pressure changes are frequently linked to substantial temperature changes which normally would cause substantial corresponding changes in the capacity of a capacitive sensor. The invention aims at compensating for such changes. Further, changes in the dielectric material between the capacitor electrode 3 and the membrane 4 can take place in response to environmental influences, for example, in response to strong external vibrations, whereby again the accuracy of the measured value or values would be adversely influenced. The invention achieves a compensation for the above mentioned influences by a reference capacitor 20 having a capacity Cr which is physically positioned close to the measuring capacitor 26 so as to be exposed to the same environmental influences but not to the values to be measured, whereby the values to be measured do not, but the environment does, vary the reference capacity in the same way as it influences the measuring capacity Cm. The reference capacitor 20 is physically constructed substantially in the same way as the measuring capacitor 26 so that environmental influences cause substantially the same capacity changes in the two capacitors, whereby the ratio of these capacity changes is always the same. As a result, environmental influences cause the same frequency changes in both oscillators 22 and 28, and these influences cancel each other.

Referring to FIGS. 2, 3a, 3b, and 4 in conjunction, the integrated computer circuit 30 is constructed as a so-called gate array (ASIC). The terminals 60, 61, 62 and 63 in FIG. 2 correspond to the same terminals 60, 61, 62, 63 in FIG. 4. The reference oscillator signal from the oscillator 22 is supplied to the input of a conventional frequency divider 64. One output signal 43 of the frequency divider 64 is shown in the impulse diagram 41 of FIG. 3a as a square wave reference signal 43. The frequency divider 64 scales down the relatively high initial reference frequency to the frequency of the square wave signal 43 which is small relative to the measuring frequency of the impulse signal 50 shown in the impulse diagram 49 of FIG. 3b and generated by the measuring oscillator 28. This relationship or ratio between the reference frequency and the measuring frequency within the range of at least 1:10, preferably 1:100, provides a gating signal to an input of a gate array 65 during the positive half wave between the rising flange 42 and the falling flank 44 of the square wave reference signal 43, whereby the rising flank 42 starts a pulse counter 66 and the falling flank 44 stops a pulse counter 66, which counts the impulses 50a of the rectangular measuring pulses 50 shown in FIG. 3b. Thus, the time between the rising and falling flanks 42, 44 constitute the measuring gate during which the counter 66 is counting. The square wave or rectangular pulses 50a of the measuring pulse train 50 represent in a simplified illustration a constant pressure sensed by the pressure sensor during the time determined by the gating signal. The number of pulses 50a counted during this gating time are stored in an intermediate memory of the computer circuit 30 so as to be available for a later signal processing.

The frequency divider 64 provides another output signal at a further output 64a for resetting the counter 66. A third output 64b of the divider 64 provides a latch enable signal to an enabling input of a latch circuit 67 which receives the count result at its input 67a from the counter 66. An output 67b of the latch circuit 67 is connected by a databus to a shift register 68 and to a pulse width modulator 69 having an output 30c also shown in FIG. 2 for providing pulse width modulated output signals An input 30a provides interrogation pulses to the circuits 68 and 69. The output 30b leads to the electronic switch 31 for loading the transponder resonance circuit 32, 32a.

The counting of the impulses 50a of the measuring pulse train 50 during the gating time constitutes the formation of a quotient between the measured frequency representing the measured value and the scaled down reference frequency. This quotient formation interlinks the system components in such a way that any substantial adverse influences or falsifications of the measured result that otherwise could be caused by an unintended change in the measuring frequency are compensated or eliminated. For example, if a temperature change at the membrane 4 would cause an unintended increase in the frequency of the measuring oscillator 30 without a change in the actual pressure to be measured, the result would be a change in the period $T_l$ of the pulses 50a in FIG. 3b. Please see in this connection the pulse trains 51 and 52 in the impulse diagram 49 of FIG. 3b. The pulse duration $T_1$ could, for example, become 7/9 $T_1$ or 11/18 $T_1$ relative to the first pulse sequence or pulse train 50, whereby a higher measuring frequency would result. However, according to the invention the gate formation is respectively reduced in time as shown at 46 and 47 of the gating pulse train 41 shown in FIG. 3a. This automatic reduction of the gate open timing is inherent in the system according to the invention to provide the desired compensation of the unintended changes in the measuring frequency of the measuring oscillator. This feature is inherent due to the construction of the measuring oscillating circuit 28 and the reference oscillating circuit 22 to be substantially identical to each other while one circuit 28 is positioned to sense the value to be measured while the other circuit 22 is not so exposed. In the present example, the reference capacitor 20 would cause a frequency change commensurate to any temperature change. As a result, the gating time of the second gate 46 would also be reduced to 7/9 T and of the third gate 47 to 11/18 T. Therefore, the same number of measuring pulses will be counted. In the example, five pulses are being counted independently of any temperature change as long as the pressure to be measured remains constant. Thus, the measured result remains the same provided the components of the measuring oscillator 28 and the components of the reference oscillator 22 are exposed to the same environmental adverse influences, whereby a substantial proportion of any falsification of the measured value is eliminated. More pulses or fewer pulses will be counted in response to actual changes in the pressure to be measured.

The computer circuit 30 samples the measuring oscillator circuit 28 with a given clock frequency in a continuously repetitive manner in response to an interrogation and the result of the sampling is stored in the shift register circuit 68 forming intermediate memories. The pulse count present in the pulse counter at each clock signal at the end of a gate pulse is supplemented in the computer circuit 30 to provide a standardized serial interface format which is then converted into a parallel-serial format. The clock signal is formed from the frequency of the supply signal provided by the power supply circuit 23 in the transducer section 25.

The circuit 23 receives its input power in the form of a wave signal that is approximately a square wave at the frequency coming from the generator circuit 24 in the interrogator receiver section 34, whereby the power supply voltage is inductively transmitted through the inductive coils 35 of the two coupled parallel oscillating circuits 35, 35a and 32, 32a.

The operation of the electronic loading switch 31 is controlled by a signal at the output 30b from the computer circuit 30. The signal loads the transponder oscillating circuit, whereby the load variations correspond to the measured signal which is transmitted through the inductive coupling of the two parallel oscillating circuits 32, 32a and 35, 35a. Referring to FIG. 2, the output of the oscillating circuit 35, 35a feeds the measured signal into the demodulator filter circuit 36 of the interrogator receiver section 34. The signal at the output of the oscillating circuit 35, 35a is practically an amplitude modulated measured signal which is demodulated in the filter and demodulator circuit 36, thereby separating the measured signal from its carrier so that at the output of the demodulator 36 only the digital, measured signal appears. The digital, measured signal is then amplified by the amplifier 37, the output signal of which is compared in the comparator circuit 38 to a reference value stored in the comparator or supplied to the comparator to thereby regenerate the signal and convert it into an undistorted square wave voltage signal. The so processed measured signals are then supplied into a signal converter 39 of the RS232 type which converts the measured signals into a respective interface voltage level, whereby the signal converting circuit 39 merely raises the signal to a respective, or rather desired, interface signal level, since the signals were already brought to the serial interface format in the sensor transponder section 25. The signal level provided at the converter 39 is sufficient so that the detected measured signal values can be processed in the following standard measured value processing devices such as a personal computer and so that these signals can be displayed by conventional displays, for example, in digital form.

Although the invention has been described with reference to specific example embodiments, it will be appreciated that it is intended to cover all modifications and equivalents within the scope of the appended claims.

What we claim is:

1. An apparatus for sensing and transmitting in a wireless manner a value to be measured, comprising sensor transponder means for sensing said value, interrogator receiver means for interrogating and receiving said value from said sensor transponder means, inductive coupling means in said sensor transponder means, and in said interrogator receiver means for at least temporarily providing a transmission path between said sensor transponder means and said interrogator receiver means, said sensor transponder means comprising a measuring oscillator circuit including a first frequency determining circuit component for producing a measuring frequency that varies with changes in said value to be measured, whereby said measuring frequency provides a measured frequency signal representing a measured value, said sensor means further comprising a reference oscillator circuit including a second frequency determining circuit component of substantially the same construction as said first frequency determining circuit component, said reference oscillator circuit being uninfluenced by said changes in said value to be measured for providing a reference frequency signal, said sensor transponder means further comprising computer circuit means connected to receive said reference frequency signal and said measured frequency signal, said computer circuit means comprising frequency divider means for dividing said reference frequency to provide a gating signal having a gating frequency substantially smaller than said measured frequency, said computer means further comprising gate circuit means controlled by said gating signal for passing said measured frequency signal through said gate circuit means, impulse counter circuit means responsive to said gate circuit means for counting impulses of said measured frequency signal during a time duration determined by said gating signal, an electronic switch means connected to receive counted and processed impulses from said gate circuit means, said inductive coupling means comprising a first oscillating transponder coupling circuit in said sensor transponder means and a second oscillating interrogator coupling circuit in said interrogator receiver means, said first oscillating coupling circuit being loaded by said electronic switch for inductively transmitting a signal from said first coupling circuit to said second coupling circuit in accordance with counted impulses to thereby transmit a measured value to said interrogator receiver means.

2. The apparatus of claim 1, wherein said first oscillating coupling circuit (32, 32a) is a resonant circuit, and wherein said second oscillating coupling circuit is also a resonant circuit, said sensor transponder means further comprising means for modulating counted measured impulses (50a) onto a carrier frequency, said first and second resonant coupling circuits transmitting the modulated measured impulses inductively from said first oscillating circuit to said second oscillating circuit when said first and second coupling circuits are in a coupled position relative to each other, said interrogator receiver means further comprising demodulating filter means (36) connected to said second resonant circuit (35) for demodulating said counted measured impulses to provide a binary measured signal which is a measure for the respective measured value.

3. The apparatus of claim 1, wherein said measuring oscillator circuit (28) and said reference oscillator circuit (22) are RC oscillator circuits (22, 28), wherein said measuring oscillator (28) comprises a measuring capacitor (26) having a variable measuring capacity (Cm) such that said measuring capacity (Cm) changes in correspondence to changes in said value to be measured, and wherein said reference gate oscillator (22) comprises a capacitor (20) having a reference capacity (Cr) which remains uninfluenced by said value to be measured, but is responsive to other influences to the same extent as said measuring capacity (Cm) for compensating said other influences.

4. The apparatus of claim 3, wherein said measuring capacitor (26) is so constructed that its variable measuring capacity (Cm) varies in response to pressure changes to which said sensor means are exposed.

5. The apparatus of claim 3, wherein said computer means comprise an integrated gate array circuit (30), the input of which is connected to said measuring capacitor (26), and wherein said frequency divider means scale down said reference frequency for also supplying a lower frequency reference signal to said gate array circuit, for producing said gating signal as a square wave gate signal (43), and for controlling said impulse counter circuit means, said computer means further comprising means for producing an output signal for controlling said electronic switch means (31) in the rhythm of measured impulses (50a) that are counted during an open gate (43).

6. The apparatus of claim 5, wherein said first resonant coupling circuit of said sensor transponder means is a parallel resonant coupling circuit (32, 32a) which is connected with an output of said gate array circuit (30), said sensor means further comprising a power supply circuit (23) connected to said parallel oscillating circuit (32, 32a) which in turn is connected in parallel to said electronic switch means (31), whereby interrogating signals providing a power supply to said sensor transponder means, are transmitted from said interrogator receiver means to said sensor transponder means.

7. The apparatus of claim 6, wherein said power supply circuit (23) of said sensor transponder means is connected with its input to said parallel resonant coupling circuit (32, 32a) which in turn is inductively coupled through said second resonant coupling circuit (35, 35a) of said interrogator receiver means to a signal generating circuit (24) which provides a square wave a.c. power supply voltage inductively transmitted to said power supply circuit (23) for converting said a.c. power supply into respective control and supply voltages, said power supply circuit having an output connected to said gate array circuit (30).

8. The apparatus of claim 7, wherein said second resonant coupling circuit of said interrogator receiver means is also a parallel resonant circuit (35, 35a) which inductively transmits said a.c. power supply voltage from said signal generating circuit (24) to said power supply (23) and which also transmits modulated measured signals from said sensor transponder means, said interrogator receiver means comprising a demodulating filter circuit (36) connected to an output of said second parallel resonant circuit (35, 35a) which is also connected in parallel to said signal generator circuit (24), said demodulating filter circuit (36) separating binary measured impulses (50a) from a modulated carrier frequency so that at the output of the demodulator filter circuit (36) a binary measured signal is provided which corresponds to the respectively measured value.

9. The apparatus of claim 7, wherein said interrogator receiver means further comprise an amplifier circuit (37) connected with its input to said demodulating filter circuit (36) for amplifying the respective binary measured signals (50a), and a comparator circuit (38) connected to receive amplified signals from said amplifier circuit (37) for comparing measured signals with a reference value to reconstitute signals.

10. The apparatus of claim 9, wherein said comparator circuit (38) comprises a flip-flop circuit controlled by said received binary measured signals so that at an output of said comparator circuit (38) undistorted binary signals are available which correspond to the measured value.

11. The apparatus of claim 9, wherein said interrogator receiver means further comprise a signal converter

(39) of the RS232C type connected to said comparator circuit (38) for converting the binary measured signals into machine readable signals, said signal converter (39) being connected through a conductor (16) to a respective signal evaluating or signal display device.

12. The apparatus of claim 1, wherein said computer circuit means comprises a gate array so constructed that binary measured signals at the output of said impulse counter circuit means have added thereto simultaneous control signals which serve for a machine readable evaluation of the measured signals.

13. The apparatus of claim 1, wherein said sensor transponder means comprises sensor housing means having a threaded end and a closed end, said threaded end being connectable to a structural component carrying a medium under a pressure to be measured, said sensor housing means enclosing all circuit components of said sensor means to form a self-contained sensor transponder section.

14. The apparatus of claim 13, wherein said threaded end comprises an opening closed by a metal membrane (4) forming an electrode for a measuring capacitor (26), said metal membrane (4) forming in said sensor housing means a chamber in which a carrier plate (6) is held in place with a determined spacing from said membrane (4), said carrier plate (6) providing a second electrode (3) forming with said membrane (4) said measuring capacitor having a variable measuring capacity (Cm) which varies in response to applied pressure, said measuring capacitor (26) having a dielectric material, such as air, between said electrode (3) and said membrane (4).

15. The apparatus of claim 14, wherein said carrier plate (6) has a circumferential rim forming a ring-shaped reference electrode (5) which cooperates with an opposite ring flange (4b) of said housing forming a radial extension of said membrane (4) to form a reference capacitor (20) having a reference capacity (Cr) between said reference electrode (5) and said ring flange (4b).

16. The apparatus of claim 15, wherein said carrier plate (6) carries on its side opposite of said electrode (3) electronic circuit components (7) which are connected with an induction coil (9) embedded in ferrite (9b) at an end portion of said sensor housing means (9a) to close said chamber of said sensor housing means thereby forming a self-contained sensor transponder section, said induction coil (9) forming part of said first resonant coupling circuit.

17. The apparatus of claim 1, wherein said interrogator receiver means (12, 34) comprise a receiver housing, said second resonant coupling circuit (35, 35a) comprising an induction coil (10, 35) embedded in a ferrite material (10a) at one end of said receiver housing, said induction coil (10, 35) being connected with an electronic circuit (13) housed in said receiver housing, said interrogator receiver means comprising, in addition to said second resonant coupling circuit (35, 35a), a signal generating circuit (24), a demodulating filter circuit (36), an amplifier circuit (37), a comparing circuit (38), and a signal converter (39) all housed in said detector housing to form a self-contained interrogator receiver section which is so connected to a structural component that at least for short time durations said interrogator receiver section (12, 34) is moved past a facing end of said sensor transponder means (8, 25).

18. The apparatus of claim 1, wherein said sensor transponder means (8, 25) and said interrogator receiver means (12, 34) are so constructed that their facing ends in which inductive coils (9, 10) are embedded, face each other at least temporarily when said sensor transponder means pass said interrogator receiver means and vice versa, and further comprising connecting elements such as a ferrite embedding material in which said inductive coils are held in their position.

19. The apparatus of claim 1, wherein said measuring oscillator circuit (28) comprises a tuning fork quartz as a frequency determining circuit component, said quartz being so constructed that its oscillating frequency varies in response to a pressure loading applied to said quartz.

20. The apparatus of claim 19, wherein the frequency determining element (20) of said reference oscillating circuit (22) is also a tuning fork quartz.

* * * * *